United States Patent [19]

Baldauf et al.

[11] 4,244,184

[45] Jan. 13, 1981

[54] AUXILIARY HYDROSTATIC DRIVE SYSTEM

[75] Inventors: Dale Baldauf, Coldwater; Larry J. Pingry, Celina, both of Ohio

[73] Assignee: Paul Revere Corporation, Greenwich, Conn.

[21] Appl. No.: 68,757

[22] Filed: Aug. 23, 1979

[51] Int. Cl.³ .................... B60K 17/34; F15B 11/06; F15B 13/06

[52] U.S. Cl. ........................ 60/420; 60/483; 60/484; 91/523; 91/532; 180/242; 180/307; 180/308

[58] Field of Search .............. 180/233, 242, 243, 307, 180/308; 60/420, 445, 483, 484; 91/532, 523

[56] References Cited

U.S. PATENT DOCUMENTS

| | | | |
|---|---|---|---|
| 3,114,424 | 12/1963 | Voreaux et al. | 180/307 X |
| 3,736,732 | 6/1973 | Jennings et al. | 180/243 X |
| 3,997,017 | 12/1976 | Campbell et al. | 180/243 X |
| 4,072,009 | 2/1978 | Daschievici et al. | 180/648 X |
| 4,140,196 | 2/1979 | Brewer | 180/242 |

*Primary Examiner*—Irwin C. Cohen
*Attorney, Agent, or Firm*—Abraham Ogman; Robert J. McNair

[57] ABSTRACT

The steerable wheels of a hydraulically driven vehicle are provided with fixed displacement type auxiliary motors which are connected in parallel both with each other and with the motor which powers the main drive wheels. A selector valve permits the motors for the steerable wheels to be optionally connected and disconnected from the reversible, variable displacement main pump. Flow dividers in the hydraulic lines limit the maximum flow of fluid to any one auxiliary drive motor. To prevent large power losses when the steerable wheel assist mode is not being utilized, the selector valves are placed in close proximity to each fixed displacement motor. This allows the motors to circulate large quantities of fluid around a closed loop at minimum pressure drop.

7 Claims, 1 Drawing Figure

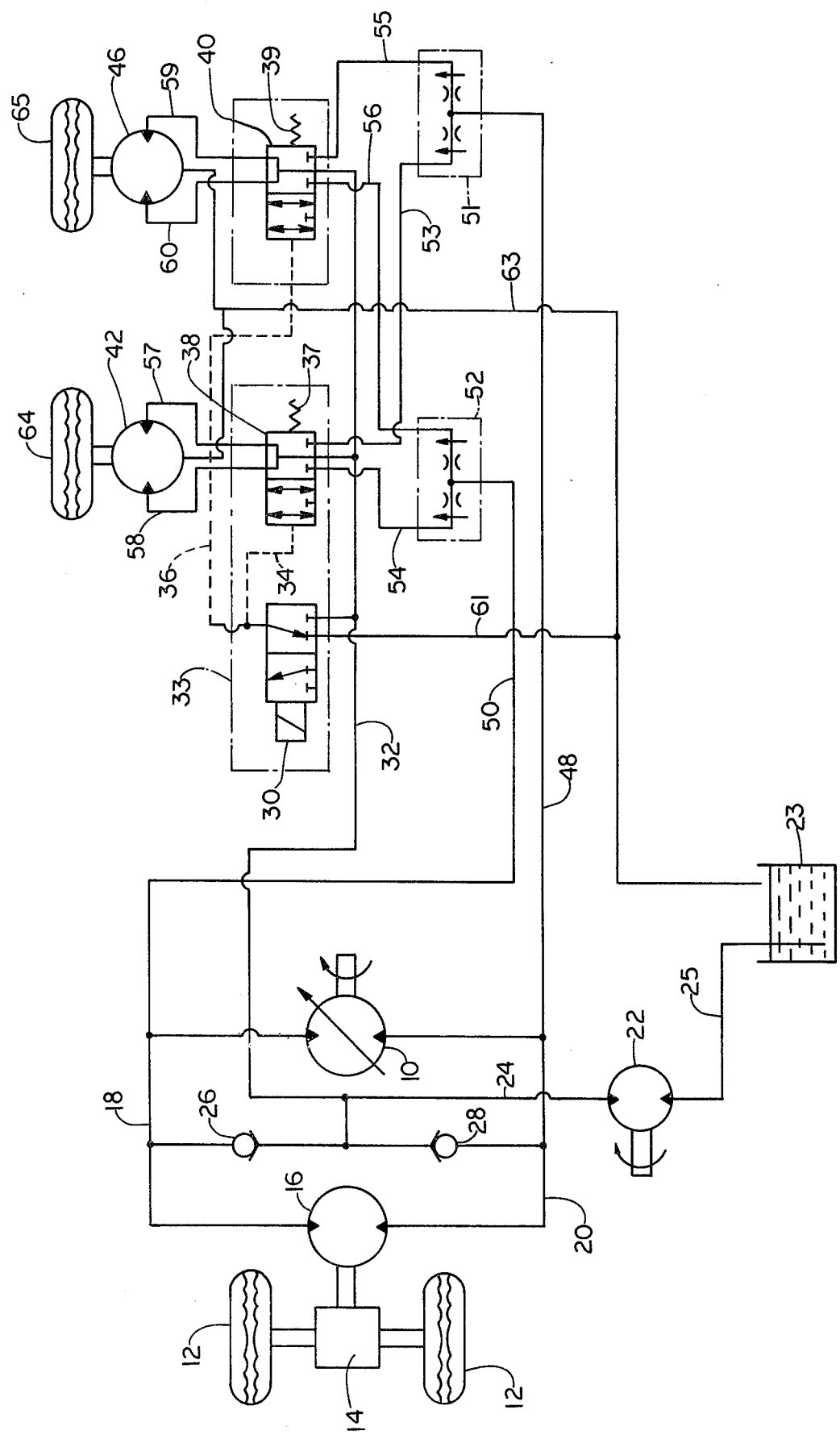

AUXILIARY HYDROSTATIC DRIVE SYSTEM

BACKGROUND OF THE INVENTION

This invention relates generally to hydraulic drive systems and more specifically to a hydraulically driven vehicle wherein motors on two of the wheels can be optionally powered as needed. Generally, an off-highway vehicle includes a load carrying body supported on both a pair of main traction wheels and a pair of steerable wheels. When operating under heavy load in soft soil conditions, it is desirable to have the steerable wheels powered as well as the main traction wheels. Once the loaded vehicle reaches a hard surfaced road, however, it is better to be able to deactivate the hydraulic drive from the steerable wheels and rely on the main drive wheels for propulsion. Deactivation on hard surfaced roads allows the top speed of the vehicle to be increased by at least a third since the main pump supplies fluid to only the main traction motor. With our invention the auxiliary drive can be used only as needed.

Various hydraulically driven vehicles are known. The U.S. Patent to Jennings, et al (No. 3,736,732) shows an auxiliary drive system for driving the steerable rear wheels of a combine. U.S. Pat. No. 3,997,017 discloses an auxiliary hydrostatic front wheel drive system having fluid pressure actuated clutches to effect a driving combination between the motors and wheels. U.S. Pat. No. 4,072,009 presents the pressure system for driving the wheels of a skid steered front loader. U.S. Pat. No. 4,140,196 shows an auxiliary drive system for optionally powering the steerable wheels of a four-wheel vehicle.

Another type of auxiliary drive system is disclosed in a copending application Ser. No. 068,756, filed Aug. 23, 1979, assigned to the same assignee as the present invention.

None of the above disclosed systems have the simplicity and inherent advantages of our invention. The powered auxiliary axle is engaged or disengaged by an electrical switch on the operator's console. The switch activates a solenoid which controls hydraulic valves located directly adjacent the respective wheel drive motors. During the disengaged mode, the steerable wheels drive the auxiliary motors, causing them to pump oil around a closed loop circuit. Our invention keeps pressure drops in the closed loop circuit to a minimum, thereby reducing energy losses under two wheel drive conditions.

SUMMARY OF THE INVENTION

It is an object of my invention to provide a highly efficient auxiliary drive system for a vehicle. Auxiliary power is supplied to the two steerable wheels of a vehicle by a pair of hydrostatic motors which are supplied fluid from the variable displacement pump which drives the main traction wheels. Fixed displacement type hydrostatic assist motors are used.

When auxiliary power is not required, the supply of hydrostatic fluid can be disconnected by a selector valve. The selector valve performs two types of control functions. First, it controls the delivery of low pressure line charging fluid to the auxiliary motors. Second, the selector valve serves to connect or disconnect the auxiliary motors with the hydraulic line system connecting them with the variable displacement pump that supplies high pressure hydrostatic fluid. When the selector valve is moved to its "disconnect auxiliary drive" position, charging pressure flows through the selector valve supplying cooling, lubrication and make-up oil to each motor while also preventing motor cavitation when they become pumps when driven by the wheels. Charging pressure also holds the rotating elements within the motor against the swash plate, thereby preventing damage to the motor.

There are flow dividers in the high pressure lines which supply fluid to the auxiliary motors. The flow dividers allow the output of the variable displacement pump to drive all motors in parallel. No one auxiliary drive motor can receive an excessive flow of fluid during a wheel spin-out. The flow dividers have been selected to allow a 10 percent variation in fluid flow to each auxiliary motor. This amount of variation has been determined as necessary to accommodate the differential action associated with steering.

With our invention, auxiliary power is provided on an operator selectable basis at each steerable wheel. This greatly improves vehicle maneuverability in soft soil conditions. The assist circuit is fully protected from uncontrolled spin-out conditions which could damage the hydrostatic motors and detract from vehicle performance. Activating a single selector valve disconnects the assist circuit completely from the main traction system.

With only one motor to drive, the main variable displacement pump can propel the vehicle at significantly higher ground travel speeds. This is due to the fact that the pump output does not have to be divided among three drive motors. However, to gain the benefits of operating the steerable wheels in an unpowered mode, consideration must be made of the fact that the fixed displacement motors act as pumps when driven by the steerable wheels. With fixed displacement motors there is no way that they can be destroked to eliminate any induced flow. In the unit reduced to practice, it was determined that each of the fixed displacement motors pumped approximately 29 gallons per minute of hydraulic fluid when the vehicle was operated at top speed. Thus, the two steerable wheels combined could cause the pumping of 58 gallons per minute. We discovered that the way to keep this from causing a heavy continuing drag on the vehicle was to minimize the restrictions to the flow of hydraulic fluid in the closed loops.

This we do by placing the control valves right at the wheels. Then when the assist motors are switched to their non-use mode, fluid flows from the motor-turned-pump through a short length of line to the control valve which completes a closed loop to redirect the fluid through a short length of line to the other side of the motor-turned-pump. Tests conducted on our reduced to practice system showed that the resultant pressure drop around the closed loop was about 160 psi when the vehicle was propelled at top speed with the steerable wheel assist motors in their free-wheeling mode. This pressure drop is about one-third of that measured in a prior art configuration. Therefore, our invention reduces energy losses by two thirds, significantly reduces operational heat buildup and greatly improves system reliability.

BRIEF DESCRIPTION OF THE DRAWING

The sole FIGURE of the drawing is a diagrammatic illustration of the preferred embodiment of a hydrostatic system for driving the steerable wheels of a vehicle.

DESCRIPTION OF THE PREFERRED EMBODIMENT

The drawing shows the general arrangement of both the main and auxiliary drive system. Hydraulic energy from a variable displacement pump 10 powers the entire system. The main drive wheels 12 of the vehicle are driven through a conventional differential gear box 14. Gear box 14 may also contain variable ratio reduction gearing so that it can be properly driven by reversible hydraulic motor 16. Motor 16 is reversibly driven through hydraulic lines 18 and 20 by output of variable displacement pump 10. Pump 10 is conventionally driven by an internal combustion engine (not shown).

The hydraulic lines of the main drive system are maintained in a charged condition by a low pressure, low volume charging pump 22 which draws fluid out of sump 23 via line 25. In most implementations, pump 22 is driven by the same prime mover which powers pump 10. Charging pump 22 connects to hydraulic lines 18 and 20 via line 24 and check valves 26 and 28. The pressure level established at the output of pump 22 enables the charging circuit to make up for any leakage in the main or auxiliary drive system.

Connected in parallel with the main drive system is the auxiliary assist system which powers the steerable wheels of the vehicle. The assist system is controlled by selector valve 30 which in the drawing is shown to be in the "off" or unpowered position. In the unit reduced to practice selector valve 30 was part of a solenoid actuated switch which could be remotely activated. As shown in the drawing, transposition of selector valve 30 to the right allows the fluid in charging line 32 to flow through lines 34 and 36. Application of charging pressure in lines 34 and 36, switches the position of spools 38 and 40 from that depicted in the drawing, to an opposite status wherein springs 37 and 39 are depressed. With both spools 38 and 40 in their actuated state, high pressure fluid can be delivered to drive fixed displacement motors 42 and 46.

In the system reduced to practice, selector valve 30 and spool 38 comprised a single unit 33 which was mounted adjacent one of the steerable wheel hubs. Spool 40 was mounted adjacent the other steerable wheel hub with line 36 crossing over between hubs.

With selector valve 30 actuated, pressurized fluid flows to motors 42 and 46 via supply lines 48 and 50. Forward pressure in line 48 causes fluid to flow through first flow divider 51. Flow divider 51 is of conventional design in that it contains a pair of fixed orifices which serve to equalize fluid flow along output lines 53 and 55. After selector valve 30 actuation, line 53 is in communication with line 57 and line 55 is placed in communication with line 59. Forward hydrostatic pressure is thus delivered to both motors 42 and 46. Similarly, actuation of selector switch 30 places line 58 in communication with line 54 and line 60 in communication with line 56. In this way reverse pressure in line 50 draws fluid back from auxiliary motors 42 and 46 via lines 54 and 56, through second fluid divider 52, along line 50 and into pump 10.

Fixed displacement motor 42 drives wheel assembly 64 through a planetary gear reduction hub (not shown). In a similar manner, fixed displacement motor 46 drives wheel assembly 65 through a second planetary gear reduction hub incorporated therein.

Conversely, when the operator wishes to have the vehicle travel in the backward direction, all that is needed is to reverse the flow of fluid through pump 10. This creates a high reverse pressure in lines 18 and 50 causing fluid flow just opposite to that described above and resulting in motors 16, 42 and 46 all rotating in the opposite direction. The need for both a forward and reverse mode of operation precludes the use of one-way clutches in the gear reduction hub assemblies associated with wheels 64 and 65.

To deactivate the auxiliary system, selector valve 30 is returned to the position shown in the drawing. In the unit reduced to practice, the spool of selector valve 30 was part of a solenoid type switch and therefor, de-energizing of the solenoid accomplished the task. It will be understood that selector valve 30 could also be a manually controlled unit. Once selector valve 30 returns to the position shown in the drawing, fluid pressure on the end of spool 38 drops and spring 37 returns spool 38 to the position shown in the drawing. This interrupts the supply of high pressure fluid coming from pump 10. Further, the orifices within spool 38 are configured such that lines 57 and 58 are both connected to the charging pressure of line 32. This assures that no air pockets appear in the lines during the deactivated period.

Similarly, return of selector valve 30 to the FIG. 1 position also removes fluid pressure from the end of spool 40. This allows spring 39 to return spool 40 to the position shown in the drawing, thereby interrupting the supply of high pressure fluid to motor 46. With spool 40 in the configuration shown in the drawing, supply lines 59 and 60 are connected to the charging pressure in line 32. The charge pressure supplies cooling lubrication and make-up oil for each motor and prevents cavitation of the motors when they are pumping such a large quantity of oil. The charge pressure also holds the rotating group in each motor against the swash plate in the motor which prevents damage to the wheel motors.

In the deactivated position shown in the drawing pressure in lines 34 and 36 can drain into sump 23 via selector valve 30 and line 61. Similarly, pressure release ports in motors 42 and 46 allow excess oil to be drained into sump 23 via line 63.

The drag on the vehicle due to the wheels driving motors 42 and 46 is proportional to motor displacement and vehicle speed. Specifically, the governing equation is as follows:

$$\text{Drag in Hp} = (P\, D\, R_T V)/(2{,}355.72\, R_L)$$

where P = pressure drop in hydraulic lines in psi.
D = motor displacement in cu. in.
$R_T$ = transmission gear ratio
V = vehicle velocity in mph.
$R_L$ = wheel radius of loaded tire in in.

For a specific implementation the values of D, $R_T$ and $R_L$ will be fixed. Therefore, study of the above equation shows that power loss due to drag is directly proportional to a constant times the product of pressure drop around the closed loop and vehicle velocity. Our invention minimizes drag by holding down the pressure drop. This is done by keeping lines 57, 58, 59 and 60 short and at the same time using lines with large internal diameters. Flow control devices have been eliminated from the closed loop portion of the system, thereby increasing operating efficiency. Also, attention is given to the internal arrangement of the connecting passageways within spools 38 and 40 so that they provide minimum restrictions to the flow of hydraulic fluid. Tests on prior art systems showed closed loop power losses of at least 15 Hp. With a system incorporating our invention, closed loop pumping losses were below 5 Hp for a vehicle speed of 16 mph.

While only a single embodiment of the invention has been presented, various modifications will be apparent to those skilled in the art. Therefore, the invention should not be limited to the specific illustration disclosed, but only by the following claims.

We claim:

1. A drive system for a vehicle propulsion unit having a pair of traction wheels comprising:
    a variable displacement pump for supplying driving fluid to hydraulic motors;
    a pair of hydraulic auxiliary motors, each of said motors having its output shaft operably connected to a wheel, each of said auxiliary motors having first and second fluid line connection means;
    selector valve means having alternate on and off positions, said selector valve means including first and second fluid control spools;
    first and second pairs of fluid lines connecting in parallel relation the two sides of each auxiliary motor to one side of said selector valve means, the first pair of fluid lines being connected to one side of said first spool, the second pair of fluid lines being connected to one side of said second spool;
    a first flow divider supplied with forward pressure fluid from said variable displacement pump;
    a second flow divider supplied with reverse pressure fluid from said variable displacement pump; and
    a pair of fluid lines connecting in parallel relation the two outputs of each flow divider with the second side of said selector valve means, whereby, (1) with the selector valve means in its "on" position, the spools in said valve means allow hydraulic fluid to be communicated between said auxiliary motors and said flow dividers, and (2) with the selector valve means in its "off" position, the spools in said selector valve means offer a short circuit at the selector valve of said first and second pairs of fluid lines while at the same time preventing flow of hydraulic fluid between said first and second flow dividers and said auxiliary motors.

2. The invention as described in claim 1 including charging pressure means for supplying low pressure fluid to said auxiliary motors when said selector valve means is in the "off" position.

3. The invention as defined in claim 2 wherein the fluid control spools of said selector valve means are actuated by charging pressure when said selector valve is switched to the "on" position.

4. The invention as defined in claim 3 wherein charging pressure on said spools is drained into said sump via fifth fluid line means when said selector valve means is switched to the "off" position.

5. The invention as defined in claim 1 wherein the wheels connected to each of said auxiliary motors are steerable.

6. The invention as defined in claim 1 wherein the first and second flow dividers interposed between the variable displacement pump and the selector valve means limit the maximum flow of hydraulic flow to any one auxiliary motor to 110 percent of the flow to the other auxiliary motor.

7. The invention as defined in claim 1 including use of a solenoid type switch in said selector valve means.

* * * * *